June 11, 1929.  F. C. F. PORTAIL  1,716,461
GALVANIC BATTERY
Filed June 14, 1927
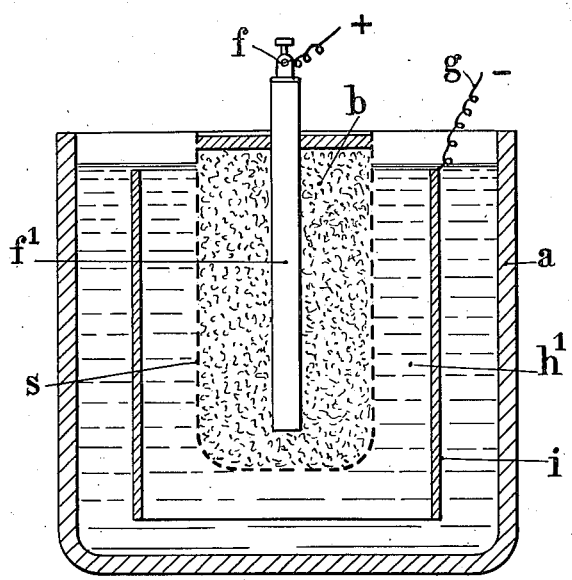
F. C. F. Portail
INVENTOR
By: Marks & Clark
Attys.

Patented June 11, 1929.

1,716,461

UNITED STATES PATENT OFFICE.

FERNAND CHARLES FRÉDÉRIC PORTAIL, OF GENNEVILLIERS, FRANCE, ASSIGNOR TO SOCIÉTÉ ANONYME LE CARBONE, OF GENNEVILLIERS, FRANCE.

GALVANIC BATTERY.

Application filed June 14, 1927, Serial No. 198,807, and in France May 13, 1927.

The present invention has reference to a method for the improved manufacture of gas accumulators such as that forming the subject matter of Patent No. 1,588,608.

As has been disclosed in the patent referred to, the accumulator shown therein is characterized by the fact that it comprises one or more porous electrodes covered over the whole of their surface by a coating impermeable to liquids, and permeable to gas. There have been claimed several methods of realizing this principle. In one of them the accumulator comprises:

(1) A carbon anode of porous type rendered impermeable to liquids, though remaining permeable to gas.

(2) A metal soluble cathode say of zinc, for example;

(3) An electrolyte, of the same metal radical as the metal of the cathode, salts of zinc for example.

In the accumulator thus constituted, when the salts of zinc contain chlorine, this latter is deposited upon the porous carbon which absorbs it very strongly, and the zinc is deposited upon the cathode.

It has been found out, owing to the very strong absorption of the chlorine by the carbon, only a fraction of the chlorine is restored at the time of the discharge. This fraction is all the smaller the higher the intensity of the discharge.

Experiments made, have shown that this drawback could be considerably reduced by adding to the zinc chloride constituting the electrolyte another halogen salt of the same metal radical that is to say the bromide or iodide of zinc and by incorporating with the active mass of impermeabilized porous carbon a metal giving with the chlorine a chloride, preferably insoluble in the electrolyte, such as lead for example.

Use can also be made of a metal whose chloride is soluble in the electrolyte but, in this case the results although advantageous are less good than in the preceding case. With a metal whose chloride is soluble, it is necessary to utilize a diaphragm.

In order to render matters quite clear, the accompanying drawings show diagrammatically one method of constructing the new accumulator, which is given solely by way of example.

This apparatus comprises a recipient $a$ of any suitable type of material not subject to attack by the products which it has to contain. This recipient contains an electrolyte $h^1$ composed of:

One litre water,
200 grammes zinc chloride,
50 grammes zinc bromide.

Into the electrolyte there is inserted a zinc cylinder $i$ constituting the negative electrode the zinc could moreover be replaced by galvanized iron.

The positive electrode is formed by a mass $b$ of active material heaped up in a sack or bag $c$, preferably of vegetable silk.

This active material is composed of a mixture of:

200 grammes charcoal rendered impermeable as specified in the patent above referred to.

100 grammes lead.

This mixture is moistened with a solution of 20% zinc chloride in order to facilitate the heaping up of the active material in the bag around a conducting device $f^1$ which is made of carbon or metal not subject to attack. It is terminated by the positive current uptake $f$.

The arrangements hereinbefore described are merely given by way of example, as all the details for carrying out the invention may vary in all cases without in any way changing the principle.

Claims:—

1. In a gas accumulator, a porous carbon anode rendered impermeable to liquids though remaining permeable to gases, said anode having incorporated with it, a metal, whose chloride is preferably insoluble, a cathode of a soluble metal, and an electrolyte comprising a mixture of a chloride and another halogen salt of the metal comprising the cathode.

2. In a gas accumulator, a porous carbon anode, rendered impermeable to liquids, though remaining permeable to gases, said anode having incorporated with it a metal whose chloride is preferably insoluble, a cathode of zinc, and an electrolyte comprising a mixture of zinc chloride and other halogen salts of zinc.

3. In a gas accumulator, a porous carbon anode rendered impermeable to liquids, though remaining permeable to gases, said anode having lead incorporated therewith, a cathode of a soluble metal, and an electrolyte comprising a chloride of the cathode metal and another halogen salt of the cathode metal.

4. In a gas accumulator, a porous carbon anode rendered impermeable to liquids, though remaining permeable to gases, said anode having lead incorporated therewith, a cathode of zinc, and an electrolyte comprising zinc chloride and zinc bromide.

The foregoing specification of my "improvement in galvanic batteries" signed by me this 1st day of June, 1927.

FERNAND CHARLES FRÉDÉRIC PORTAIL.